Sept. 6, 1949.  H. C. CUSKIE  2,481,088
VALVE STRUCTURE
Filed Dec. 29, 1944
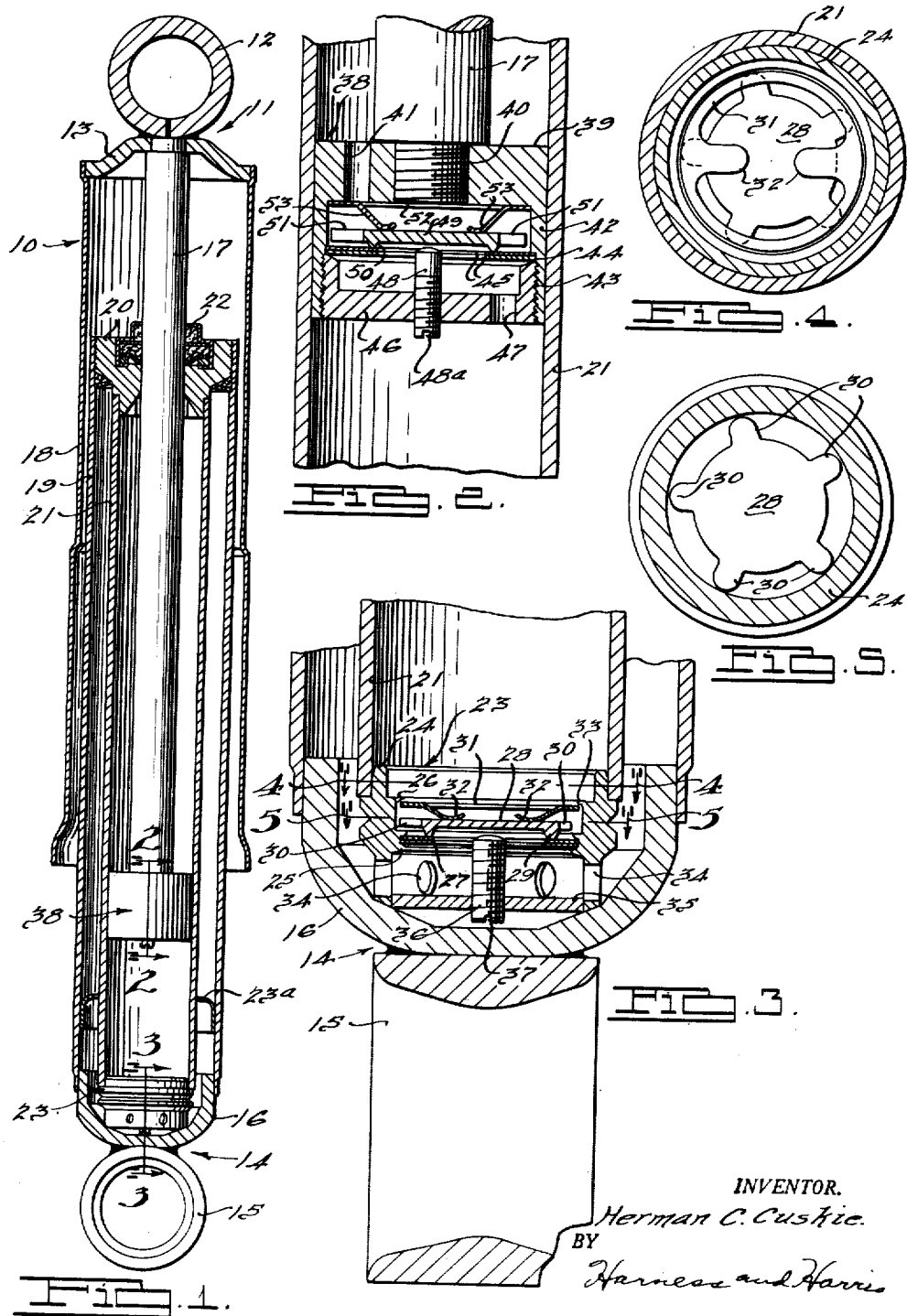
INVENTOR.
Herman C. Cuskie
BY
Harness and Harris
ATTORNEYS.

Patented Sept. 6, 1949

2,481,088

UNITED STATES PATENT OFFICE 2,481,088

VALVE STRUCTURE

Herman C. Cuskie, Rolla, Mo., assignor to Chrysler Corporation, Highland Park, Mich., a corporation of Delaware Application December 29, 1944, Serial No. 570,306

2 Claims. (Cl. 251—144)

This application relates to a valve structure. More specifically it relates to a valve adapted for use in an hydraulic shock absorber.

A typical hydraulic shock absorber in general use today may involve a valve construction composed of two-way valves. One valve operates at a relatively low pressure for passing fluid in one direction, and the other operates at a relatively high pressure for passing fluid in the opposite direction. I have devised a valve construction for a shock absorber which essentially combines the two one-way valves into a single valve that will pass fluid in opposite directions at different pressures. Not only is this new valve simpler, but also it is easier to clean.

An object of the present invention is to provide an improved valve structure. More specifically such valve structure is to be capable of use in a hydraulic shock absorber both as the valve for the piston thereof as well as the compression valve.

A further object is to simplify a construction involving two associated valves into a single valve serving the function of the two valves. The single valve may be substituted for two opposed one-way valves and so will be capable of two-way operation at different pressures.

Another object is to provide improvements and simplification in a valve construction which facilitate cleaning and other care.

Other objects will appear from the disclosure.

In the drawings:

Fig. 1 is a longitudinal sectional view through a shock absorber employing the novel valve construction of the present invention;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 3; and

Fig. 5 is a sectional view taken on the line 5—5 of Fig. 3.

The reference character 10 designates the shock absorber of the present invention, which includes an upper head 11 composed of a ring 12 and a disk 13 and a lower head 14 composed of a ring 15 and a cup 16. The disk 13 is joined to the ring 12 by soldering or welding and has an opening receiving the reduced end of a piston rod 17 in a welded or soldered connection. A tubular sleeve 18 is secured to the disk 13 by soldering or welding. The cup 16 is secured to the ring 15 by soldering or welding, and soldering or welding secures the lower end of a tubular sleeve 19 to the cup 16.

The upper end of the sleeve 19 receives a bushing 20 in a threaded connection. The piston rod 17 has a sliding fit in the bushing 20 and is sealed by means of a seal 22 mounted in the bushing 20. The upper end of a sleeve 21 is secured by soldering or welding to the bushing 20 and the lower end of the sleeve 21 is similarly secured to a compression valve structure 23. A baffle 23ᵃ is positioned in the space between the tubular sleeves 19 and 21.

The compression valve structure 23, which is best illustrated in Fig. 3 has a body 24 secured by soldering or welding to the lower end of the tubular sleeve 21 and resting within the base of the cup 16. The body 24 has a passage in the walls of which are formed lips 25 and 26 which hold the outer peripheries of a pair of deformable annular disks 27, which may be termed a resistance valve. For example, the lower lip 25 may be formed in the body 24 originally, and the upper lip may be formed by a peening operation after the disks 24 are in place on the lower lip 25. A cover part or inlet valve 28 has an annular bead 29 at one side and five outwardly extending short locating fingers 30, as seen in Fig. 5, serving to maintain the cover part 28 against excessive lateral movement in the passage in the body 24. A resilient means formed of a stamped ring 31 having two opposed inwardly extending fingers 32 depressed from the plane of the ring as shown in Figs. 3 and 4, lightly holds the rib 29 of the cover part 28 in engagement with the inner periphery of the one disk 27. A flange 33, peened from the valve body 24, holds the ring 31 in place. The body 24 has a plurality of side openings 34. A plate 35 is secured in the base of the body 24 and supports in threaded engagement a threaded adjustable stop 36, having an upper end adapted to be engaged by the cover part 28 in its downward movement and its lower end a slot 37, adapted to receive a screw driver for adjustment of the stop 36.

The piston rod 17 is attached to a piston 38, which includes a cup-shaped member 39, receiving in threaded engagement a reduced end 40 of the piston rod 17. The cup-shaped member 39 has a plurality of openings 41 spaced about the reduced end 40 of the piston rod 17, only one opening being shown. The member 39 has a relatively thick wall portion 42 and a relatively thin wall portion 43 interiorly threaded. Between the wall portions 42 and 43 is a shoulder 44 against which the outer peripheries of a pair of annular deformable disks 45, which may be considered a resistance valve, are clamped by a flanged member 46 threaded within the wall portion 43. The flanged member 46 has one or more openings 47 and supports in threaded engagement an adjustable threaded stop 48 having a slot 48ª at one end, adapted to receive a screw driver for adjustment of the stop 48. The stop 48 is adapted to contact a cover part or inlet valve 49 having on one side an annular bead 50 engageable with the one annular disk 45 adjacent its inner periphery and a plurality of outwardly extending fingers 51 serving to locate the cover part 49 within the wall portion 42 and to prevent excessive lateral movement. Resilient means formed of a stamped ring 52 having opposed fingers 53 pressed out of the plane of the ring 52 act between the base of the cup-shaped member 39 and the cover part 49 to maintain the bead 50 of the cover 49 in engagement with the one disk 45 near its inner periphery.

The rings 12 and 15 are to be suitably connected to parts, not shown, between which the shock absorber 10 is to operate. Fluid is located in tube 21 between the piston 38 and the compression valve 23, above the piston 38, and in the reserve chamber between tubes 19 and 21. When the rings 12 and 15 move toward one another, the piston 20 moves down in the tube or cylinder 21. The fluid tends to flow upwardly through the piston 38, and this takes place without much pressure, for the cover part or inlet valve 49 is easily lifted off the annular disks 45 against the action of the resilient fingers 53 of the ring 52. When the rings 12 and 15 tend to move away from one another, the piston 38 tends to move up in the cylinder 21. Fluid tends to flow down through the piston. This causes the cover part 49 to move down and the inner peripheries of the annular disks 45 to move down. The cover part 49 eventually contacts the adjustable stop 48 and so further downward movement of the cover part is prevented. Further downward movement of the inner peripheries of the disks 45 causes them to move out of contact with the annular bead on the cover part 49, and so fluid may flow downwardly through the piston 38, and the piston may move upwardly. The pressure at which the annular disks 45 are deformed downwardly out of engagement with the cover part 49 is considerably higher than the pressure at which the cover part 49 is raised upwardly from engagement with the annular disks 45. This makes the shock absorber 10 operate in the usual and desired manner; i. e., there is considerably greater resistance to movement of the parts away from one another between which the shock absorber is connected than to movement of the parts toward one another. This is accomplished by the valve construction on the piston 38, which involves the annular disks 45 and the cover part 49 capable of two-way operation at different pressures. A very important feature of this arrangement is that the valve construction is self-cleaning. When the pressure is upward, the cover part 49 is easily moved upwardly out of contact with the disks 45, and so dirt or foreign matter tending to collect at this region is easily removed.

The compression valve 23 operates in much the same fashion as the valve construction in the piston 38. First, it should be explained that the compression valve 23 and the reservoir between the tubes 19 and 21 are provided so that there is compensation for the space occupied by the piston rod 17. As the piston moves downwardly, the smaller area above the piston 38 due to the piston rod 17 makes the volume for fluid above the piston increase at a lesser rate than the volume for fluid below the piston 38 decreases. Thus there must be an escape for fluid to accommodate the resultant decrease in volume. Conversely, as the piston 38 goes up, there must be an inlet for fluid to accommodate the increase in volume due to the decrease in volume above the piston 38 at a lower rate than the increase of volume below the piston. The compression valve 23 provides the inlet and outlet of the fluid, and the space between the tubular sleeves 19 and 21 constitutes the reservoir for the extra fluid. As the piston 38 moves down, the total volume for fluid above and below the piston decreases, and escape for the fluid is provided between the cover part 28 and the disks 27. This does not take place until the pressure of the fluid has reached a considerable value. Downward pressure of the fluid causes the inner peripheries of the disks 27 to deform and move downwardly and the cover part 28 to move downwardly with its annular bead in contact with one disk 27 adjacent its inner periphery until the cover part 28 contacts the adjustable stop 36. Further downward movement of the cover part 31 is prevented and further downward movement of the inner peripheries of the annular disks 27 causes the one disk to move out of engagement with the annular bead 29 on the disk 28. Fluid may now escape downwardly between the cover part 28 and the annular disks 27. When the piston 38 moves upwardly, fluid pressure against the valve 23 is upward and acts to lift the cover part 28 easily from the annular disks 27. This happens at a relatively low pressure. As is the case with valve construction in the piston 38, the valve 23 is self-cleaning, because the plate 28 is easily moved upwardly from the disks 27 to permit the removal of dirt or other foreign matter.

The stops 36 and and 48 may be adjusted by rotation to stop downward movement of the lower parts at different positions, and thus the pressures at which fluid will escape by virtue of movement of the annular disks 27 or 45 away from the cover parts 28 or 49 will be varied.

I claim:

1. A valve comprising a cup-shaped structure including a base portion provided with an opening therein, a body portion comprising a continuous annular wall, and means forming a shoulder in the wall at a region spaced from the base portion, a resilient flat deformable element positioned within the cup-shaped structure with its periphery at the shoulder and comprising an annular inner margin movable with respect to the periphery away from the base of the cup-shaped structure under deformation of the element and defining a valve opening, a retainer fitting in threaded engagement with said wall for holding the periphery of the deformable element fixedly against the shoulder, a member positioned between the base portion of the cup-shaped structure and the deformable element, said member covering the valve opening and having an annular rib engaging the annular inner margin of said deformable element, said member being movable away from the base portion of the cup-shaped structure so as to remain in contact with the annular inner margin of the deformable element during the above-described movement of said inner margin, an adjustable threaded device having a slot at one end for rotation by a tool and being mounted in the retainer so as to project through the valve opening and having its other end engageable with a central portion of said member, thereby allowing the inner margin of said deformable element to move away from said member for opening the valve passage, and spring means to normally hold said member in engagement with said deformable element, said retainer and said member being provided with means to allow passage of fluid through the valve when said member and said deformable element are out of contact.

2. A valve comprising a cup-shaped structure including a base portion provided with an opening therein, a body portion comprising a continuous annular wall, and means forming a shoulder in the wall at a region spaced from the base portion, a resilient flat deformable element positioned within the cup-shaped structure with its periphery at the shoulder and comprising an annular inner margin movable with respect to the periphery away from the base of the cup-shaped structure under deformation of the element and defining a valve opening, a retainer fitting in threaded engagement with said wall for holding the periphery of the deformable element fixedly against the shoulder, a member positioned between the base portion of the cup-shaped structure and the deformable element, said member covering the valve opening and having an annular rib engaging the annular inner margin of said deformable element, said member being movable away from the base portion of the cup-shaped structure so as to remain in contact with the annular inner margin of the deformable element during the above-described movement of said inner margin, an adjustable threaded device having a slot at one end for rotation by a tool and being mounted in the retainer so as to project through the valve opening and having its other end engageable with a central portion of said member, thereby allowing the inner margin of said deformable element to move away from said member for opening the valve passage, and spring means to normally hold said member in engagement with said deformable element, said retainer and said member being provided with means to allow passage of fluid through the valve when said member and said deformable element are out of contact, said spring means comprising a plurality of resilient fingers disposed in the base portion of the cup-shaped structure to bias said member for normally maintaining the aforesaid engagement with the deformable element, said member being easily movable against the action of the resilient fingers thereby to insure bodily separation of the member from the fixedly located flat element upon condition of relative pressure rise in said valve opening.

HERMAN C. CUSKIE.

REFERENCES CITED

The following references are of record in the file of this patent:

UNITED STATES PATENTS

| Number | Name | Date |
| --- | --- | --- |
| 652,176 | Gabel | June 19, 1900 |
| 1,236,583 | Manning | Aug. 14, 1917 |
| 2,110,691 | Aikman | Mar. 8, 1938 |
| 2,138,513 | Rossman | Nov. 29, 1938 |
| 2,287,842 | Tabb | June 30, 1942 |
| 2,296,732 | Oyston | Sept. 22, 1942 |
| 2,320,697 | Binder | Jan. 1, 1943 |
| 2,329,803 | Whisler | Sept. 21, 1943 |